(12) United States Patent
Mansar et al.

(10) Patent No.: US 11,481,389 B2
(45) Date of Patent: Oct. 25, 2022

(54) GENERATING AN EXECUTABLE CODE BASED ON A DOCUMENT

(71) Applicant: FORTIA FINANCIAL SOLUTIONS, Paris (FR)

(72) Inventors: Youness Mansar, La Garenne-Colombes (FR); Sira Ferradans, Paris (FR)

(*) Notice: Subject to any disclaimer, the term of this patent is extended or adjusted under 35 U.S.C. 154(b) by 414 days.

(21) Appl. No.: 16/012,797

(22) Filed: Jun. 20, 2018

(65) Prior Publication Data

US 2019/0188270 A1 Jun. 20, 2019

(30) Foreign Application Priority Data

Dec. 18, 2017 (EP) .................................. 17306801
May 14, 2018 (EP) .................................. 18305584

(51) Int. Cl.
*G06F 16/2452* (2019.01)
*G06Q 40/06* (2012.01)
*G06F 8/30* (2018.01)
*G06F 16/93* (2019.01)
*G06F 16/2455* (2019.01)

(52) U.S. Cl.
CPC .......... *G06F 16/24522* (2019.01); *G06F 8/30* (2013.01); *G06F 16/2455* (2019.01); *G06F 16/93* (2019.01); *G06Q 40/06* (2013.01)

(58) Field of Classification Search
CPC .. G06F 40/289; G06F 16/24522; G06F 16/93; G06F 16/2455; G06F 8/30; G06Q 40/06
See application file for complete search history.

(56) References Cited

U.S. PATENT DOCUMENTS

| | | | |
|---|---|---|---|
| 6,654,735 B1 | 11/2003 | Eichstaedt et al. | |
| 2003/0167267 A1* | 9/2003 | Kawatani | G06F 16/353 |

(Continued)

FOREIGN PATENT DOCUMENTS

| | | | | |
|---|---|---|---|---|
| AU | 4186700 A | * | 10/2000 | ............ G06Q 40/06 |
| CN | 107291795 A | | 10/2017 | |
| WO | WO-0058900 A1 | * | 10/2000 | ............ G06Q 40/06 |

OTHER PUBLICATIONS

Ferradans et al., "Machine learning and rule detection," May 29, 2017. (https://www.fortia.fr/machine-learning-andrule-detection/).

(Continued)

*Primary Examiner* — Etienne P Leroux
*Assistant Examiner* — Farhad Agharahimi
(74) *Attorney, Agent, or Firm* — Robert Facey (57) ABSTRACT

Methods, systems, and computer program products for generating an executable code based on a document are disclosed. Rules are identified in a document, the identified rules are translated into encoded rules, and an executable code is generated from the encoded rules. Identification of rules includes splitting a text of the document into a plurality of sentences; and for each sentence of the plurality of sentences, determining whether the sentence corresponds to a rule. Translation of an identified rule into an encoded rule includes extracting, from the identified rule, elements corresponding to predefined categories; determining one or more relationships between the extracted elements; and translating the one or more determined relationships into a structured expression. Generating the executable code from the encoded rules includes translating the structured expression associated with the identified rule into a programming language query.

19 Claims, 4 Drawing Sheets

(56) References Cited

U.S. PATENT DOCUMENTS

| | | | |
|---|---|---|---|
| 2005/0154690 A1* | 7/2005 | Nitta | G06F 16/30 |
| | | | 707/E17.058 |
| 2016/0148116 A1* | 5/2016 | Bornea | G06N 5/022 |
| | | | 706/12 |
| 2017/0039188 A1 | 2/2017 | Allen et al. | |
| 2017/0116178 A1* | 4/2017 | Kumar Rangarajan Sridhar | ........ |
| | | | H04W 4/14 |
| 2017/0239576 A1* | 8/2017 | Hsiao | A63F 13/63 |
| 2017/0308790 A1 | 10/2017 | Nogueira dos Santos et al. | |
| 2018/0137137 A1* | 5/2018 | Jin | G06F 16/90324 |
| 2018/0144234 A1* | 5/2018 | Devesa | G06N 3/006 |

OTHER PUBLICATIONS

Extended European Search Report of counterpart European Application No. 18305584.7, dated Dec. 6, 2018.

Friedman, J., Hastie. T., & Tibshirani, R. The elements of statistical learning Springer, second edition, 2008, Ch. 12.

Goodfellow Ian, Yoshua Bengio, and Aaron Courville Deep learning MIT press, 2016, Ch.9.

Youness Mansar et al "Fortia-FBK at SemEval-2017 Task 5: Bullish or Bearish, Inferring Sentiment towards Brands from Financial News Headlines" arxiv.org. Cornell University Ithaca, NY 14853 Apr. 4, 2017 (Apr. 4, 2017), XP080760585.

Jacopo Staiano et al "DepecheMood: a Lexicon for Emotion Analysis from Crowd-Annotated News", Proceedings of the 52nd Annual Meeting of the Association for Computational Linguistics (Short Papers), May 7, 2014 (May 7, 2014), pp. 427-433, XP055483290.

Yoon Kim Convolutional Neural Networks for Sentence Classification arXiv preprint arXiv:1408.5882, 2014.

Yoon Kim "Instantly share code, notes, and snippets. Convolutional Neural Network for Sentence Classification Introduction", 2016, XP055483311.

English Language Translation of CN 107291795A.

* cited by examiner

GENERATING AN EXECUTABLE CODE BASED ON A DOCUMENT

CROSS-REFERENCE TO RELATED APPLICATIONS

This present application claims priority to European Patent Application No. 17 306 801.6, filed on Dec. 18, 2017, and European Patent Application No. 18 305 584.7, filed on May 14, 2018, both of which are incorporated herein by reference in their entireties.

FIELD

The present disclosure relates to the field of electronic document processing.

TECHNICAL BACKGROUND

Natural language interface to databases (NLIDB) are techniques that translate a query expressed as a natural language sentence into a database query. As such, they facilitate database access by enabling easier human-computer interaction that does not require knowledge of database languages.

Typically, an NLIDB system has a linguistic component and a database component. The linguistic component is responsible for translating natural language into a query, and vice versa. This component is similar to semantic text analysis and involves locating entities of interest and identifying relationships between them. However, it differs from semantic text analysis in term of its scope. Specifically, the data in the database restricts the number of entities that can be located, and the operations that can be performed by a database search limit the relationships that can be established between those entities. The database component of an NLIDB system relates to translating the structured information obtained by the linguistic component into operations and variables that can be interpreted by a database.

NLIDB systems generally deal with a single query formulated by a user. Thus, the NLIDB system knows that it is a query that it is being provided as input. However, NLIDB systems cannot handle a document having a text with multiple potential queries of interest. In other words, NLIDB systems cannot, without user input, identify whether or not a document contains queries of interest and formulate database queries, if any, accordingly.

SUMMARY

The present disclosure provides a method for generating an executable code based on a document. The method comprises:
  identifying rules in the document, wherein identifying the rules comprises: splitting a text of the document into a plurality of sentences; and for each sentence of the plurality of sentences, determining whether the sentence corresponds to a rule;
  translating the identified rules into encoded rules, wherein translating the identified rules comprises: extracting, from an identified rule, elements corresponding to predefined categories; determining one or more relationships between the extracted elements; and translating the one or more determined relationships into a structured expression; and
  generating the executable code from the encoded rules, wherein generating the executable code comprises translating the structured expression associated with the identified rule into a programming language query.

Accordingly, the method allows converting a document containing rules into an executable code. The executable code can be executed on input data, such as a database, to determine if the rules are satisfied by the input data. In other words, the document is converted automatically, without user input, into multiple queries that can be at once applied to input data, such as a database.

The programming language query may be an SQL query or a NoSQL query, for example.

In an embodiment, the method further comprises: running the executable code on input data to determine if the input data violates one or more of the identified rules; and generating an alarm if the input data violates one or more of the identified rules. This allows to readily verify if the input data is in compliance with the rules identified in the document. If the input data is not compliant, the alarm alerts a responsible party to the non-compliance of the input data.

In an embodiment, running the executable code on the input data comprises applying the programming language query to a database storing the input data. This allows for the input data to be stored in a database and to be probed by running the executable code as needed.

In an embodiment, identifying the rules further comprises, for each sentence of the plurality of sentences, pre-processing and encoding the sentence.

In an embodiment, extracting the elements corresponding to the predefined categories comprises: determining for each word in the identified rule a category from the predefined categories, wherein determining the category for the word comprises determining a dictionary from among a plurality of dictionaries in which the word appears and setting a type of the determined dictionary as the category for the word; and generating a tagged rule in which each word is tagged with its determined category.

In an embodiment, the predefined categories include geographical location, mathematical operator, financial instrument, or currency.

In an embodiment, determining the one or more relationships between the extracted elements comprises applying a rule-based method to the tagged rule. This includes comparing the tagged rule to a set of predefined templates sequentially to determine a matching template. In an embodiment, a predefined template includes elements of different types and is associated with a respective relationship that relates the elements to each other.

In an embodiment, determining whether the sentence corresponds to a rule comprises:
  associating each word of the sentence with a respective word-vector;
  generating a sentence-vector for the sentence;
  if the sentence-vector is present in a stored mapping of sentence-vectors to tags, retrieving a tag associated with the sentence vector from the stored mapping;
  if the sentence-vector is not present in the stored mapping, determining a tag for the sentence-vector; and
  determining if the sentence corresponds to a rule based on the tag associated with the sentence-vector.

In an embodiment, the sentence-vector is normalized before determining the tag associated with it.

In an embodiment, determining whether the sentence corresponds to a rule comprises:
  generating a sentence-vector for the sentence; and
  determining the Euclidian distance between the sentence-vector and stored sentence-vectors;

if the Euclidian distance between the sentence vector and a stored sentence vector is less than a predetermined threshold, associating with the sentence vector a tag associated with the stored sentence vector.

In an embodiment, the document is an investment fund prospectus and the identified rules include fund investment rules.

In another aspect, embodiments provides a non-transitory computer readable medium having control logic stored thereon, the control logic when executed by a processor causes the processor to perform a method for generating an executable code based on a document according to any of the method embodiments described above.

In a further aspect, embodiments provide a computer system, comprising a processor and a memory storing control logic, the control logic when executed by the processor causes the processor to perform a method for generating an executable code based on a document according to any of the method embodiments described above.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DETAILED DESCRIPTION OF EXAMPLE EMBODIMENTS

Embodiments of the present disclosure provide systems, methods, and computer program products for generating an executable code based on a document and for running the executable code on input data. Various applications of the described embodiments can be envisioned as would be understood by a person of skill in the art based on the teachings herein. In one example, the document is a compliance document that specifies rules. For example, the document may be, without limitation, a legal document (e.g., law, statute, ordinance, directive, contract, license, etc.), a financial document (e.g., financial regulations, fund prospectus, investment strategy, etc.), or an organizational document (e.g., organization charter, corporation bylaws, etc.). The input data is historical, current (e.g., real-time), or future (e.g., predicted or simulated) data relating to activities subject to the rules specified in the compliance document. For example, in an embodiment, the document may be a prospectus published by an investment fund that specifies the fund's investment rules (i.e., how the fund will invest its clients' contributions). The to prospectus legally obligates the fund and non-compliance with the prospectus' investment rules could lead to fines being levied onto the fund by regulatory authorities. The input data is fund data describing investment activities (e.g., trades, positions, etc.) of the fund. The fund data may be historical (e.g., covering a specified period of time), current (e.g., describing the fund's investment positions at present), or future (e.g., predicted or simulated). According to this embodiment, the prospectus may be automatically converted into an executable code that encodes the investment rules specified in the prospectus. The executable code may be executed on the fund data to determine compliance of the fund with the prospectus. An alarm may be generated in the event of non-compliance to alert, e.g., the fund manager that a change of investments may be needed.

Figure 1:
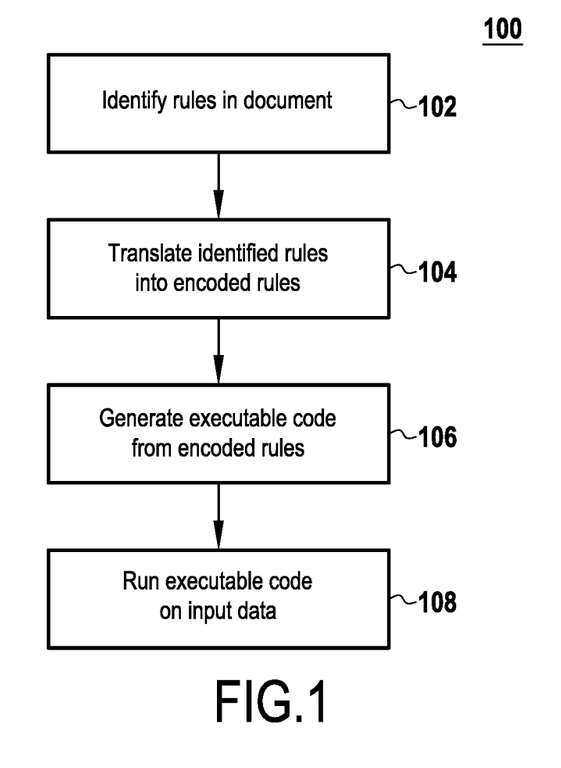
FIG. 1 illustrates an example process for generating an executable code based on a document according to an embodiment.

FIG. 1 illustrates an example process 100 for generating an executable code based on a document according to an embodiment. Example process 100 is provided for the purpose of illustration only and is not limiting of embodiments of the present disclosure.

As shown in FIG. 1, process 100 begins in step 102, which includes identifying rules in a document. In embodiments, the document may be any text document specifying rules. For example, the document may be, without limitation, a legal document (e.g., law, statute, ordinance, directive, contract, license, etc.), a financial document (e.g., financial regulations, fund prospectus, investment strategy, etc.), or an organizational document (e.g., organization charter, corporation bylaws, etc.).

In an embodiment, rule identification may be performed according to the process described further below in FIG. 2. In another embodiment, the rule identification process may be tailored according to the document being processed so as to extract the relevant rules from the document. For example, where the document is a fund prospectus, the process may be tailored to identify investment rules in the prospectus document. This may include providing the process with a priori knowledge about the document structure (headings, section placement, etc.), document, formatting (font, font size, etc.), relevant document sections, and relevant keywords typically found in the document.

After identifying the relevant rules in the document, process 100 proceeds to step 104, which includes translating the identified rules into encoded rules. In an embodiment, this includes translating a natural language sentence (i.e., a rule) into a structured expression (e.g., a JavaScript Object Notation (JSON) file format). In an embodiment, step 104 may be performed according to the process described further below in FIG. 5.

Next, in step 106, process 100 includes generating an executable code from the encoded rules. In an embodiment, this includes translating the structured expression associated with each identified rule into a programming language query. The programming language query may be an SQL query or a NoSQL query, for example. In an embodiment, the transformation of the structured expression into a programming language query is done in a rule-based manner that translates a human-understandable expression into a machine-understandable expression or script.

Process 100 terminates in step 108, which includes running the executable code on input data. The input data may be historical, current (e.g., real-time), or future (e.g., predicted or simulated) data relating to activities subject to the rules specified in the document. In an embodiment, the execution of the code on the data allows to determine if the input data is in compliance with the rules encoded by the executable code.

Figure 2:
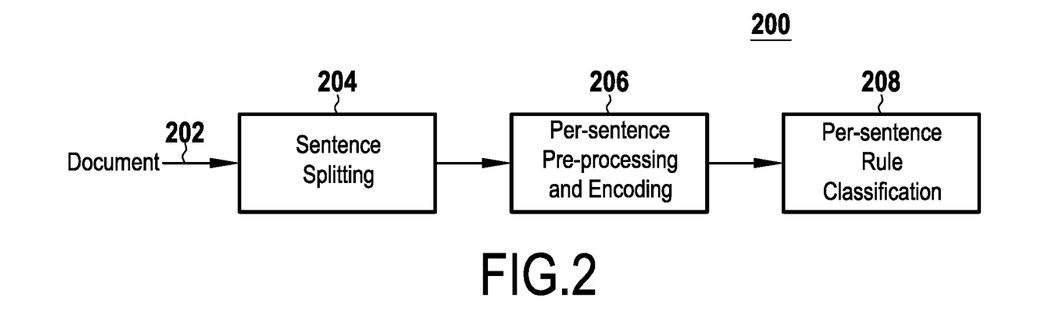
FIG. 2 illustrates an example process for identifying rules in a document according to an embodiment.

FIG. 2 illustrates an example process 200 for identifying rules in a document according to an embodiment. Example process 200 is provided for the purpose of illustration only and is not limiting of embodiments of the present disclosure.

As shown in FIG. 2, process 200 begins in step 202, which includes receiving a document. The document may be any text document specifying rules. For example, the document may be, without limitation, a legal document (e.g., law, statute, ordinance, directive, contract, license, etc.), a financial document (e.g., financial regulations, fund prospectus, investment strategy, etc.), or an organizational document (e.g., organization charter, corporation bylaws, etc.).

Subsequently, in step 204, the process includes splitting into sentences is the text contained in the document. In an embodiment, step 204 may further include, before the sentence splitting, discarding non-relevant sections of the document. This may be performed by training the algorithm to identify the relevant sections of the document based on the type of the document being processed.

Next, steps 206 and 208 include per-sentence processing for the sentences identified in step 204. Specifically, step 206 includes per-sentence pre-processing and encoding. In an embodiment, sentence pre-processing includes replacing capital letters with lowercase letters and deleting predefined characters (e.g., punctuations, percentage signs, URLs) from the sentence. In an embodiment, the output of the sentence pre-processing is a concatenation of words without punctuation. Sentence encoding includes associating the sentence with a sentence-vector as further described below.

Step 208 includes per-sentence rule classification. In an embodiment, step 208 includes determining whether the sentence corresponds to a rule, i.e., one of the rules of relevance based on the document being processed. For example, where the document is a fund prospectus, relevant rules are those describing investment rules of the fund. In an embodiment, step 208 may be performed according to the process described further below in FIG. 3. However, embodiments are not limited to using the process of FIG. 3. In other embodiments, other classification methods such as the one described in Kim (Yoon Kim, Convolutional Neural Networks for Sentence Classification, arXiv preprint arXiv: 1408.5882, 2014), the Support Vector Modifier (SVM) method (Friedman, J., Hastie, T., & Tibshirani, R., The elements of statistical learning, Springer, second edition, 2008), or the Convolutional Neural Network (CNN) (Goodfellow, Ian, Yoshua Bengio, and Aaron Courville, Deep learning, MIT press, 2016) may be used in step 208.

Figure 3:
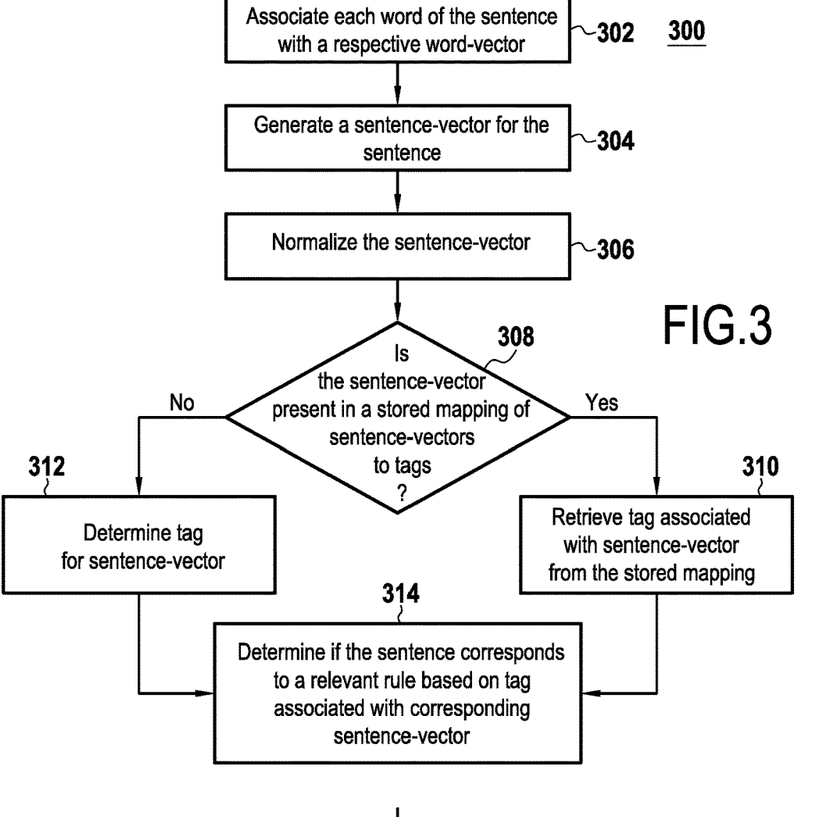
FIG. 3 illustrates an example process for rule classification according to an embodiment.

FIG. 3 illustrates an example process 300 for rule classification according to an embodiment. Example process 300 is provided for the purpose of illustration only and is not limiting of embodiments of the present disclosure. In an embodiment, process 300 may be used in steps 206 and 208 of process 200 described above. Process 300 is performed on a per-sentence basis and begins in step 302, which includes associating each word of the sentence with a respective word-vector. In an embodiment, step 302 may include verifying whether the word being processed is already associated with a word-vector in a database. If so, then step 302 may include retrieving the word-vector from the database. Otherwise, step 302 may include generating a word-vector for the word and storing the word-vector in the database.

In an embodiment, generating the word-vector may include employing a "word embedding" technique. The word embedding technique may be implemented using a weighted least squares model that trains on global word-word co-occurrence counts, or a two layer neural network trained on predicting the word given the context.

Once a word-vector is determined for every word in the sentence, process 300 proceeds to step 304, which includes generating a sentence-vector for the sentence. In an embodiment, the sentence-vector is computed as a weighted average of the word-vectors of the words composing the sentence. In an embodiment, each word-vector is associated with a weight whose value is inversely proportional to the probability of the respective word being found in the document. For example, the weight associated with a word-vector may be the inverse of the frequency of appearance of the respective word in the document.

Subsequently, process 300 may optionally include, in step 306, normalizing the sentence-vector. In an embodiment, normalizing the sentence-vector includes projecting the sentence-vector s on a precomputed sentence-vector C, subtracting the projection result from the sentence-vector s, and dividing the resulting vector by its magnitude.

In an embodiment, the normalizing of a sentence-vector is performed according to the following algorithm:

$stemp=s$
$s'=stemp-<stemp,C>C$
$s=s'/|s'|$ where stemp is a temporary variable used to store the value of the sentence-vector before normalization; s is the sentence-vector after normalization; $\|$ represents the vector magnitude operator; $<,>$ represents the dot product operator; and C represents the first component of the Principal Component Analysis (PCA) of a predefined set of sentences vectors. The PCA method includes fitting an ellipsoid to the training set. The axes of the ellipsoid are the principal components. Vector 'C' corresponds to the biggest principal component.

Next, step 300 proceeds to step 308, which includes determining whether the sentence-vector (from step 304 or 306) is present in a stored mapping of sentence-vectors to tags. In an embodiment, step 308 includes determining the Euclidian distance between the sentence-vector and the sentence-vectors of the stored mapping. In an embodiment, step 308 requires a search through all of the stored sentence-vectors in the stored mapping. In embodiment, the search may be performed using an exhaustive search, a multidimensional binary search tree used for associative searching, for example the kd-tree algorithm disclosed by Bentley (Bentley, J. L., Multidimensional binary search trees used for associative searching, Communications of the ACM, 18(9), 509-517, 1975), or a branch and bound algorithm, for example the ball-tree algorithm describe by Fukunaga et al. (Fukunaga et al., A Branch and Bound Algorithm for Computing K-Nearest Neighbors, IEEE Trans. Computers, C-24 (7):750-753, 1975.)

If the Euclidian distance between the sentence-vector and a stored to sentence-vector is less than a predetermined threshold, then the sentence-vector is determined to be the same or similar to the stored sentence-vector and process 300 branches to step 310. In step 310, the tag associated with the matching stored sentence-vector is retrieved and associated with the sentence-vector.

Otherwise, process 300 branches to step 312, which includes determining a tag for the sentence-vector. In an embodiment, step 312 includes generating a matrix M where the matrix column of index T contains the word-vector associated with the i-th word of the current sentence; determining the tag for the sentence-vector using the matrix and a pre-trained classification method; and storing the tag in association with the sentence-vector in the stored mapping. In an embodiment, the pre-trained classification method may be a sentence classification method as proposed by Kim (Yoon Kim, Convolutional Neural Networks for Sentence Classification, arXiv preprint arXiv:1408.5882, 2014), or any other supervised classification method, such as the SVM method (Friedman, J., Hastie, T., & Tibshirani, R., The elements of statistical learning, Springer, second edition, 2008) or the CNN method (Goodfellow, Ian, Yoshua Bengio, and Aaron Courville, Deep learning, MIT press, 2016).

Following step 310 or 312, process 300 proceeds to step 314, which includes determining if the sentence corresponds to a rule based on the tag associated with the corresponding sentence-vector. In an embodiment, this includes determining if the tag is associated with one or more predetermined labels associated with one or more predetermined rules.

Figure 4:
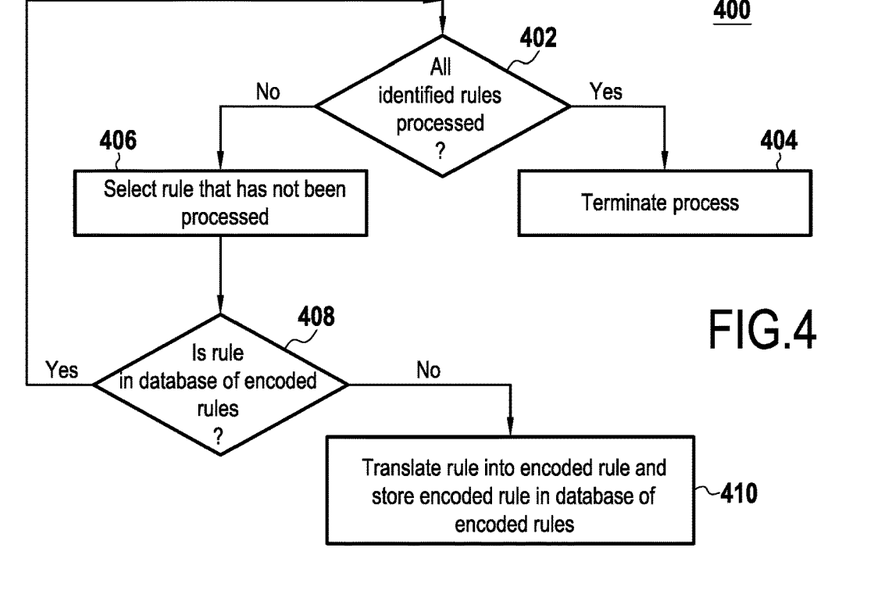
FIG. 4 illustrates an example process for translating identified rules in a document into encoded rules according to an embodiment.

FIG. 4 illustrates an example process 400 for translating identified rules in a document into encoded rules according to an embodiment. Example process 400 is provided for the purpose of illustration only and is not limiting of embodiments of the present disclosure. In an embodiment, process 400 may be used in step 104 of process 100 described above.

As shown in FIG. 4, process 400 begins in step 402, which includes determining if all identified rules have been processed, i.e., translated into respective encoded rules. If the answer is yes in step 402, process 400 terminates in step 404. Otherwise, process 400 proceeds to step 406, which includes selecting a rule that has not yet been processed from the identified rules, and determining, in step 408, if the selected rule already exists in a is database of encoded rules. If the answer is yes, process 400 returns to step 402. Otherwise, process 400 proceeds to step 410, which includes translating the selected rule into an encoded rule and storing the encoded rule in the database of encoded rules. In an embodiment, translating the selected rule into an encoded rule is performed according to the process described below in FIG. 5.

Figure 5:
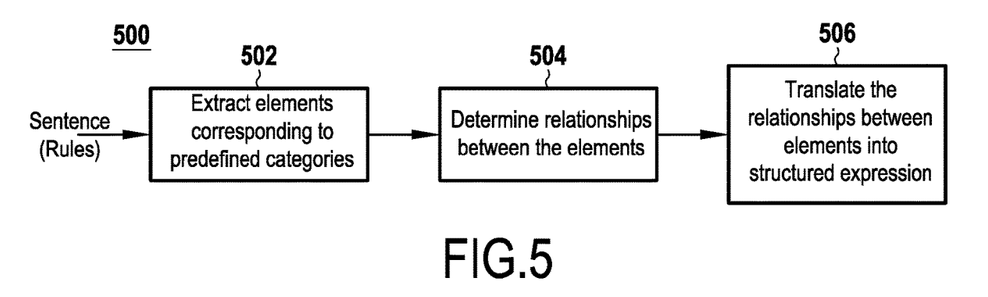
FIG. 5 illustrates an example process for translating a rule into an encoded rule according to an embodiment.

FIG. 5 illustrates an example process 500 for translating a rule into an encoded rule according to an embodiment. Example process 500 is provided for the purpose of illustration only and is not limiting of embodiments of the present disclosure. In an embodiment, process 500 may be used in step 104 of process 100 described above.

As shown in FIG. 5, process 500 begins in step 502, which includes receiving an identified rule represented by a sentence and extracting, from the identified rule, elements corresponding to predefined categories. The predefined categories may depend on the type of document being processed. For example, in the case of a prospectus, the predefined categories may include categories such as geographical location, mathematical operator, financial instrument, or currency. Each of the predefined categories is associated with a respective dictionary that contains all possible values and/or synonyms relevant to the category.

In an embodiment, step 502 includes determining for each word in the identified rule a category from the predefined categories, and generating a tagged rule in which each word is tagged with its determined category. In an embodiment, determining the category for a word includes determining a dictionary from among a plurality of dictionaries (associated with the predefined categories) in which the word appears and setting a type of the determined dictionary as the category for the word. For example, if the rule contains the word "euro", the word may be located in the "Currency" dictionary and may be tagged as a "Currency" element.

Next, process 500 proceeds to step 504, which includes determining one or more relationships between the extracted elements from step 502. In an embodiment, step 504 includes applying a rule-based method to the tagged rule, which includes comparing the tagged rule to a set of predefined templates sequentially to determine a matching template. Each predefined template includes elements of different types and is associated with a respective relationship that relates the elements to each other. For example, a template may include a mathematical operator, a number, and a financial instrument and may be associated with a relationship that relates its elements to each other. For example, a template including the elements "less than or equal", "number", and "financial instrument" may be associated with the relationship "financial instrument is less than or equal to number". Step 504 thus determines the template that best matches the tagged rule with its extracted elements so as to determine the one or more relationships between the extracted elements.

Process 500 terminates in step 506, which includes translating the one or more determined relationships into a structured expression. In an embodiment, this includes translating a natural language sentence (i.e., a rule) into a structured expression (e.g., a JavaScript Object Notation (JSON) file format). For instance, 'investment instrument' (bonds) with 'operator' (lower than) and 'numeric percentage value' (5%), is translated into a 'limit relationship':

limit: 5
type of value: %
bound: upper
financial instrument: 'bonds'

Figure 6:
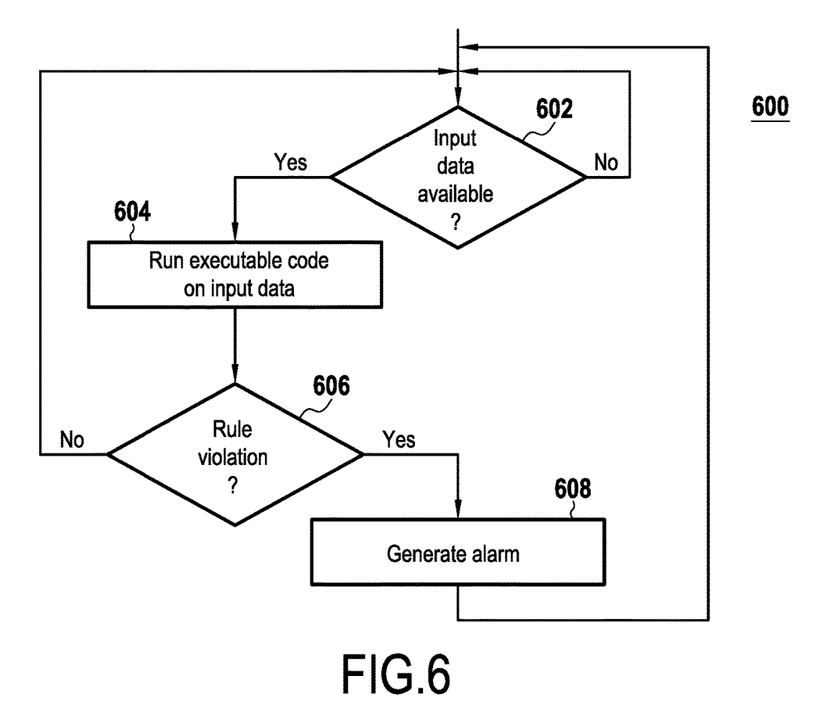
FIG. 6 illustrates an example process for applying a generated executable code to input data according to an embodiment.

FIG. 6 illustrates an example process 600 for applying a generated executable code to input data according to an embodiment. Example process 600 is provided for the purpose of illustration only and is not limiting of embodiments of the present disclosure. As shown in FIG. 6, process 600 begins in step 602, which includes determining if input data is available. In an embodiment, process 600 may be set to run periodically (e.g., daily, weekly, monthly, annually) or at the occurrence of predefined events.

If no input data is available, process 600 may terminate or return to step 602 to check for the availability of input data at the next prescribed time. Otherwise, if input data is available, process 600 proceeds to step 604, which includes running the executable code on the input data. In an embodiment, running the executable code on the input data comprises applying a programming language query to a database storing the input data.

Subsequently, step 606 includes determining if the input data violates one or more rules encoded by the executable code. If no rule violation is detected, process 600 may terminate or return to step 602 to check for the availability of input data at the next prescribed time. Otherwise, process 600 proceeds to step 608, which includes generating an alarm. For example, where the input data is fund data and the executable code encodes investment rules identified in a prospectus, the alarm may alert, e.g., the fund manager that a change of investments may be needed to ensure compliance with the prospectus.

Figure 7:
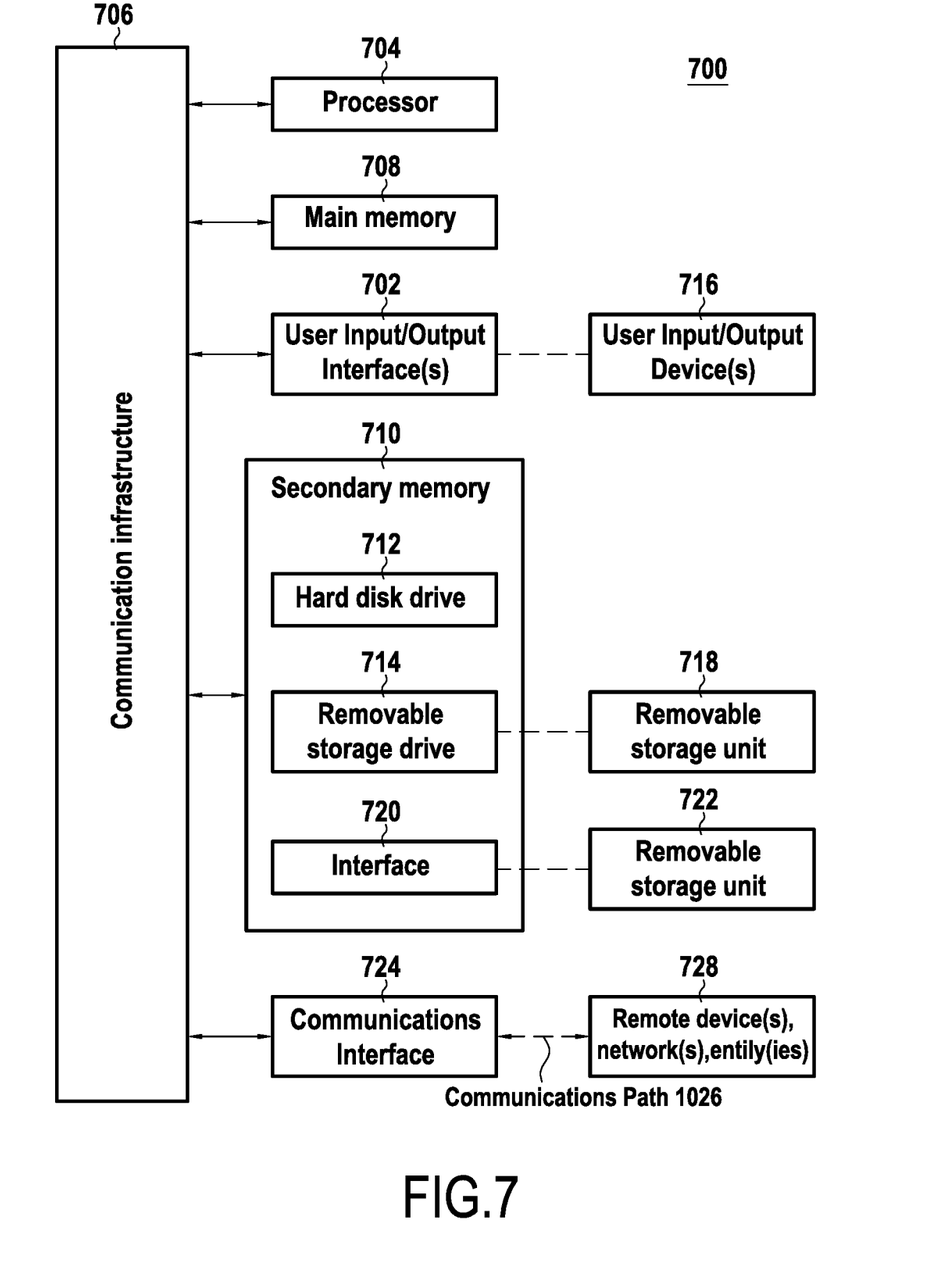
FIG. 7 illustrates an example computer system in which embodiments may be implemented according to an embodiment.

FIG. 7 illustrates an example computer system 700 in which embodiments may be implemented. Computer system 700 includes one or more processors (also called central processing units, or CPUs), such as a processor 704. Processor 704 is connected to a communication infrastructure or bus 706. Processor 704 may be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 716, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data that when executed by the one or more processors 704 perform the above described embodiments, including the processes described in FIGS. 1-6.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, a tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communications or network interface 724. Communications interface 724 enables computer system 700 to communicate and interact with any combination of remote devices, remote networks, remote entities, etc. (individually and collectively referenced by reference number 728). For example, communications interface 724 may allow computer system 700 to communicate with remote devices 728 over a communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 7.

ADDITIONAL VARIANTS

Although the present disclosure has been described above with reference to certain specific embodiments, it will be understood that the disclosure is not limited by the particularities of the specific embodiments. Numerous variations, modifications and developments may be made in the above-described embodiments within the scope of the appended claims.

The invention claimed is:

1. A method for generating an executable code based on a document, comprising:
   identifying rules in the document, wherein identifying the rules comprises:
      splitting a text of the document into a plurality of sentences; and
      for each sentence of the plurality of sentences, determining whether the sentence corresponds to a rule;
   translating the identified rules into encoded rules, wherein translating the identified rules comprises:
      extracting, from an identified rule, elements corresponding to predefined categories;
      determining one or more relationships between the extracted elements; and
      translating the one or more determined relationships into a structured expression; and
   generating the executable code from the encoded rules, wherein generating the executable code comprises translating the structured expression associated with the identified rule into a programming language query,
   wherein extracting the elements corresponding to the predefined categories comprises:
   determining for each word in the identified rule a category from the predefined categories, wherein each of the predefined categories is associated with a respective dictionary and wherein determining the category for the word comprises determining a dictionary from among a plurality of dictionaries in which the word appears and setting a type of the determined dictionary as the category for the word; and
   generating a tagged rule in which each word is tagged with its determined category, wherein the determined category is set as a type of a dictionary in which the word appears.

2. The method of claim 1, further comprising:
   running the executable code on input data to determine if the input data violates one or more of the identified rules; and
   generating an alarm if the input data violates one or more of the identified rules.

3. The method of claim 2, wherein running the executable code on the input data comprises applying the programming language query to a database storing the input data.

4. The method of claim 1, wherein identifying the rules further comprises, for each sentence of the plurality of sentences, pre-processing and encoding the sentence.

5. The method of claim 1, wherein the predefined categories include geographical location, mathematical operator, financial instrument, or currency.

6. The method of claim 1, wherein determining the one or more relationships between the extracted elements comprises applying a rule-based method to the tagged rule.

7. The method of claim 6, wherein applying the rule-based method to the tagged rule comprises comparing the tagged rule to a set of predefined templates sequentially to determine a matching template.

8. The method of claim 7, wherein a predefined template includes elements of different types and is associated with a respective relationship that relates the elements to each other.

9. The method of claim 1, wherein determining whether the sentence corresponds to a rule comprises:
    associating each word of the sentence with a respective word-vector;
    generating a sentence-vector for the sentence based on the respective word-vector associated with said each word of the sentence;
    if the sentence-vector is present in a stored mapping of sentence-vectors to tags, retrieving a tag associated with the sentence vector from the stored mapping;
    if the sentence-vector is not present in the stored mapping, determining a tag for the sentence-vector; and
    determining if the sentence corresponds to a rule based on the tag associated with the sentence-vector.

10. The method of claim 1, wherein determining whether the sentence corresponds to a rule comprises:
    generating a sentence-vector for the sentence; and
    determining the Euclidian distance between the sentence-vector and stored sentence-vectors;
    if the Euclidian distance between the sentence vector and a stored sentence vector is less than a predetermined threshold, associating with the sentence vector a tag associated with the stored sentence vector.

11. The method of claim 9, further comprising normalizing the sentence-vector.

12. The method of claim 1, wherein the programming language query is an SQL query or a NoSQL query.

13. The method of claim 1, wherein the document is an investment fund prospectus and the identified rules include fund investment rules.

14. A non-transitory computer readable medium having control logic stored thereon, the control logic when executed by a processor causes the processor to perform a method for generating an executable code based on a document, the method comprising:
    identifying rules in the document, wherein identifying the rules comprises:
        splitting a text of the document into a plurality of sentences; and
        for each sentence of the plurality of sentences, determining whether the sentence corresponds to a rule;
    translating the identified rules into encoded rules, wherein translating the identified rules comprises:
    extracting, from an identified rule, elements corresponding to predefined categories;
    determining one or more relationships between the extracted elements; and
    translating the one or more determined relationships into a structured expression; and
    generating the executable code from the encoded rules, wherein generating the executable code comprises translating the structured expression associated with the identified rule into a programming language query,
    wherein extracting the elements corresponding to the predefined categories comprises:
    determining for each word in the identified rule a category from the predefined categories, wherein each of the predefined categories is associated with a respective dictionary and wherein determining the category for the word comprises determining a dictionary from among a plurality of dictionaries in which the word appears and setting a type of the determined dictionary as the category for the word; and
    generating a tagged rule in which each word is tagged with its determined category, wherein the determined category is set as a type of a dictionary in which the word appears.

15. The non-transitory computer readable medium of claim 14, wherein the method further comprises:
    running the executable code on input data to determine if the input data violates one or more of the identified rules; and
    generating an alarm if the input data violates one or more of the identified rules.

16. The non-transitory computer readable medium of claim 14, wherein the document is an investment fund prospectus and the identified rules include fund investment rules.

17. A computer system, comprising:
    a processor; and
    a memory storing control logic, the control logic when executed by the processor causes the processor to:
    identify rules in a document, wherein identifying the rules comprises:
        splitting a text of the document into a plurality of sentences; and
        for each sentence of the plurality of sentences, determining whether the sentence corresponds to a rule;
    translate the identified rules into encoded rules, wherein translating the identified rules comprises:
    extracting, from an identified rule, elements corresponding to predefined categories;
    determining one or more relationships between the extracted elements; and
    translating the one or more determined relationships into a structured expression; and
    generate the executable code from the encoded rules, wherein generating the executable code comprises translating the structured expression associated with the identified rule into a programming language query,
    wherein extracting the elements corresponding to the predefined categories comprises:
    determining for each word in the identified rule a category from the predefined categories, wherein each of the predefined categories is associated with a respective dictionary and wherein determining the category for the word comprises determining a dictionary from among a plurality of dictionaries in which the word appears and setting a type of the determined dictionary as the category for the word; and
    generating a tagged rule in which each word is tagged with its determined category, wherein the determined category is set as a type of a dictionary in which the word appears.

18. The computer system of claim 17, wherein the control logic further causes the processor to:
    run the executable code on input data to determine if the input data violates one or more of the identified rules; and generate an alarm if the input data violates one or more of the identified rules.

19. The computer system of claim 17, wherein the document is an investment fund prospectus and the identified rules include fund investment rules.

\* \* \* \* \*